United States Patent [19]
Yao et al.

[11] 3,840,407
[45] Oct. 8, 1974

[54] COMPOSITE POROUS ELECTRODE

[75] Inventors: Neng-Ping Yao, Sylmar; Robert L. Oliver; Harvey N. Seiger, both of Granada Hills, all of Calif.

[73] Assignee: Textron, Inc., Providence, R.I.

[22] Filed: June 19, 1972

[21] Appl. No.: 263,835

[52] U.S. Cl. .......................... 136/120 FC
[51] Int. Cl. .......................... H01m 13/00
[58] Field of Search........ 136/120 FC, 120 R, 86 A, 136/86 D, 20, 22, 30, 31; 29/182, 182.2, 182.5, 187.5; 75/208, 212; 264/105, 111-112, 127

[56] References Cited
UNITED STATES PATENTS

| | | | |
|---|---|---|---|
| 3,328,202 | 6/1967 | Riffe | 136/22 |
| 3,432,355 | 3/1969 | Niedrach et al. | 136/120 FC X |
| 3,457,113 | 7/1969 | Deibert | 136/120 FC X |
| 3,513,029 | 5/1970 | Giner et al. | 136/120 FC X |
| 3,556,856 | 1/1971 | Elbert | 136/86 |
| 3,600,230 | 8/1971 | Stachurski et al. | 136/120 FC X |
| 3,615,841 | 10/1971 | Smith et al. | 136/120 |

*Primary Examiner*—Anthony Skapars
*Attorney, Agent, or Firm*—Nilsson, Robbins, Bissell, Dalgarn & Berliner

[57] ABSTRACT

A composite porous electrode for use as a gas-diffusion electrode in a battery assembly is formed by coating one surface of a porous plaque of non-corrosive metal with a layer of hydrophobic material, for repelling aqueous electrolyte solution, and coating the opposite surface with a layer of electronically conductive material dispersed in a hydrophobic binder therefor. The second coating is formed of a plurality of successive, integral layers of increasing concentration of electronically conductive material. Principally, for larger sized electrodes, the second coating is formed with a thickness differential from bottom to top to balance hydrostatic pressure differentials in the electrolyte. A battery assembly is provided in which a pair of porous electrodes are secured on opposite sides of a consumable electrode with aqueous electrolyte therebetween. The housing is formed with ducts and cavities to direct electrochemically reactive fluid, such as halogen gas, against the outer surfaces of the porous electrodes.

18 Claims, 8 Drawing Figures

———— Al(Hg)/Cl₂ — Graded
—·—·— PbO₂/Pb
— — — Ni/Cd
—•—•— Al/Cl₂ Molten Electrolyte 3,840,407

COMPOSITE POROUS ELECTRODE

FIELD OF THE INVENTION

The fields of art to which the invention pertains include the fields of electrochemical converters, fuel cells, gas-type primary batteries and batteries incorporating halogen electrolyte solutions.

BACKGROUND AND SUMMARY OF THE INVENTION

It is well established that pollution of the atmosphere occurs in a large part as a result of automotive internal combustion engines. It has been suggested to replace such engines with electric motors powered by on-board batteries. However, the low energy densities of present day batteries make such electric automobiles impractical as a replacement for the internal combustion engine in automobiles. In efforts to overcome these deficiencies, a number of exotic electrochemical cells have been developed having energy densities an order of magnitude greater than the common lead-acid battery. Among these are the hydrogen-oxygen fuel cell, which is too expensive for practical use, silver-zinc batteries which have limited life and are very costly, and sodium-sulfur, lithium-chlorine and lithium-sulfur batteries, which are costly, operate hot and must be sealed from the atmosphere. Nickel-cadmium and lead-acid batteries of improved design have also been developed. Some of these batteries, such as the lead-acid battery have a very low recharge efficiency at high rates of charge and are only useful in hybrid systems in which the batteries are recharged during operation. Other systems which have been discussed in the prior art are aluminum-chlorine systems utilizing molten or fused electrolyte, for example a molten eutectic salt of aluminum-chloride-potassium chloride-sodium chloride. A number of aqueous systems have been suggested utilizing a gas-diffusion cathode in aqueous electrolyte solution and a zinc or alkaline earth metal anode. Some older patents refer to accumulator electrodes utilizing an electrolyte cation identical to the active anode component. Illustrative patent disclosures of the foregoing systems can be found in LeDuc U.S. Pat. Nos. 3,294,586 and 3,421,994, Zito, Jr. U.S. Pat. No. 3,285,781, Blue et al. U.S. Pat. No. 3,408,232, Childs U.S. Pat. No. 3,445,292, Portail U.S. Pat. No. 1,716,461, Oppenheim U.S. Pat. No. 1,588,608 and Stokes, Jr. U.S. Pat. No. 2,796,456. Also of some interest are U.S. Pat. Nos. 3,040,115, 3,073,884, 3,455,744, 3,459,596, 3,507,700 and 3,514,334.

Even batteries which can be efficiently recharged at high rates suffer harsh drawbacks since practical recharging would require specially constructed recharging stations with very unusual capabilities. For example, for recharging in less than 10 minutes, the charging station would have to be vast and the cables large and expensive. In order to recharge a 20 kilowatt hour system in 10 minutes, one would need a 120 kilowatt supply. If the output of the battery is 80 volts, the required current would be 1,500 amperes.

A novel high energy density battery assembly is disclosed in patent application Ser. No. 141,906, now abandoned, entitled AQUEOUS ALUMINUM-HALOGEN ELECTROCHEMICAL CONVERTER, by H. N. Seiger and E. L. Ralph, and in patent application Ser. No. 141,880, entitled ACTIVATED ALUMINUM ANODE FOR ELECTROCHEMICAL CONVERTER, by H. N. Seiger, both filed May 10, 1971 and assigned to the assignee of the present application, the disclosures of which are incorporated herein by reference. The battery assembly disclosed by these applications may be mechanically "recharged," i.e., the reactive components are simply replaced. Specifically, the battery assembly utilizes a consumable aluminum anode and a cathode comprising halogen diffused through a porous, electrically conductive electrode, in an aqueous electrolyte solution. The halogen is metered in accordance with load requirements, until the aluminum anode is effectively exhausted. Thereupon, the anode and electrolyte are simply replaced. Subsequently, aluminum and halide can be recovered from the electrolyte solution to provide a closed ecological cycle. The nature of the porous gas electrode is of major importance to the efficient operation of such consumable anode battery assemblies.

The use of a gas electrode is well known in general fuel cell technology (see "Handbook of Fuel Cell Technology," by C. Berger, Prentice-Hall, Inc., Englewood Cliffs, N.J., 1968). A gas electrode (which can more generally be considered as a type of oxidizing or fuel electrode) consists of a current collector having a porous structure which divides the introduced reactive fluid from a liquid electrolyte. The porous electrode also provides a large active surface for the electrochemical reaction of the introduced fluid. While the porous structure and the materials for the porous electrode may vary depending upon the electrochemical system, the electrode must be (1) impervious to the liquid electrolyte, (2) inert to corrosion, (3) highly electrically conductive and (4) catalytically active for the electrode reaction. Furthermore, the weight and the volume of the electrode must be kept at a minimum in order to achieve a system with high specific energy and high specific power. Of interest, in this regard, is the report "Thin Fuel Cell Electrodes," by K. V. Kordesch, Report No. 4, June 1, 1963–May 31, 1964, Contract No. DA–36–00, AMC–02314(E), Task No. 1C6–220–01–A053–04.

The present invention provides a porous electrode which meets the foregoing criteria. A thin, lightweight composite porous electrode is provided which can be used in a highly corrosive environment, which provides consistent uniform metering of the introduced electrochemically active fluid and which performs with the high degree of efficiency necessary to effective utilization of the active material. Application of the present porous electrode is not limited to fuel cell systems, but includes industrial and commercial electrochemical cells which utilize a corrosive gaseous or other fluid reactant.

The composite porous electrode is constructed by applying successive layers of a combination of hydrophobic binder material and electrically conductive particles, sufficient pressure being applied after each deposition to provide good electrical contact between the successive layers. Specifically, the present electrode consists of a porous metal body having a first surface for facing an electrochemically reactive fluid and a second surface for facing an electrolyte solution. A coating of hydrophobic material is applied to the first surface and a similar coating, but having electrically conductive particles dispersed therethrough, is applied to the second surface facing the electrolyte. The coating of electrically conductive particles comprises a plurality of successively applied layers having successively greater concentrations of the conductive particles. In a particular embodiment, an electrode of very high efficiency is provided by grading the coating material, or the porous metal body, so that the electrode has a thickness differential between bottom and top, the electrode increasing in thickness from the bottom edge to the top edge so as to compensate for hydrostatic pressure differentials in the electrolyte.

A novel battery assembly is provided in which the porous and the consumable electrodes are secured in a housing and spaced by open frame members wherein the electrolyte is contained. The housing is formed with walls which include space for the electrochemically reactive fluid and which direct the fluid against the outer surfaces of the porous electrodes.

DETAILED DESCRIPTION

Figure 1:
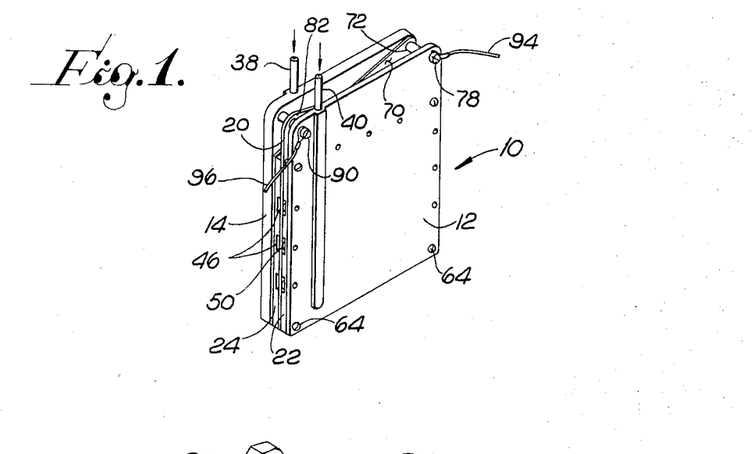
FIG. 1 is a perspective view of a battery assembly incorporating a porous electrode and consumable anode.
Figure 2:
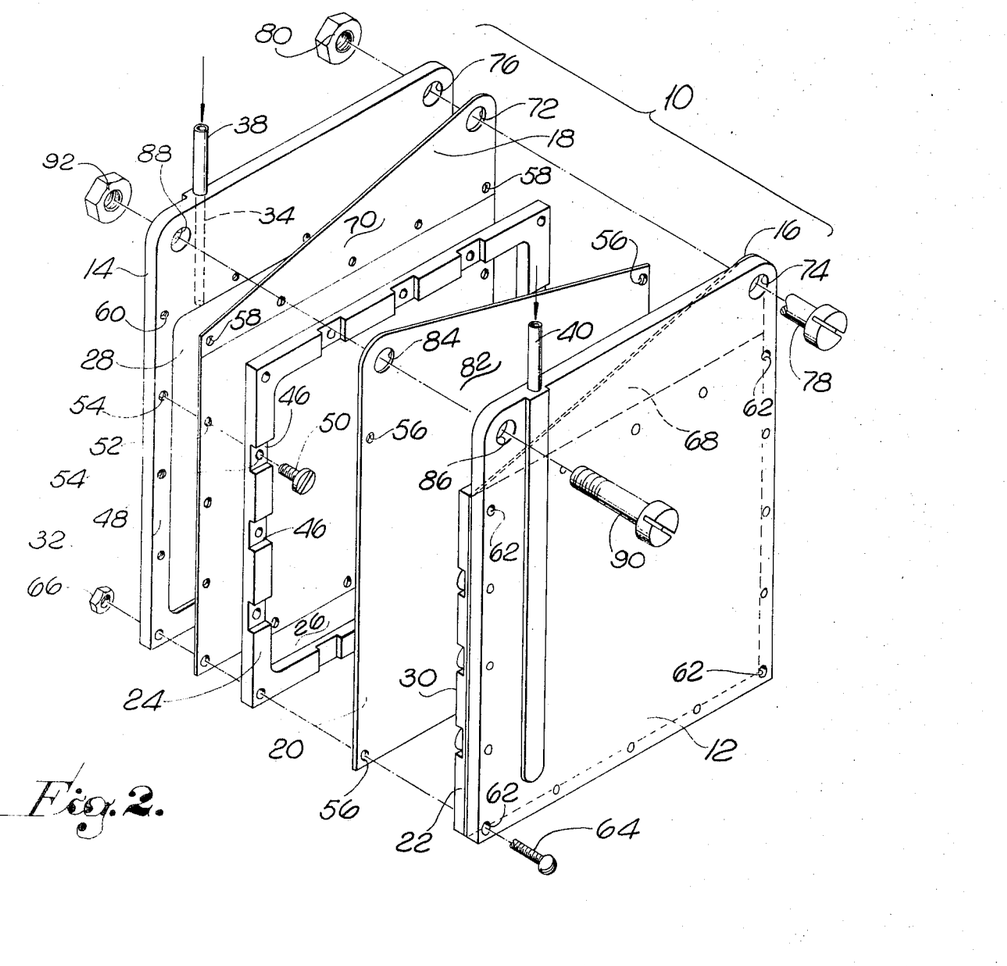
FIG. 2 is a perspective, exploded view of the battery assembly of FIG. 1.

Referring to FIGS. 1 and 2, a battery assembly 10 is illustrated including a non-conductive, e.g., of plastic, housing having front and rear walls 12 and 14 which are juxtaposed to sandwich a pair of flat, thin porous electrodes 16 and 18 and a consumable aluminum anode 20 between the porous electrodes 16 and 18. A pair of open frame members 22 and 24 of plastic or other non-conductive material, have their outer edges juxtaposed on opposite sides of the aluminum anode 20 to space the porous electrodes 16 and 18 therefrom. The open frame members 22 and 24 thus provide reservoirs, e.g., at 26, for enclosing electrolyte solutions between the respective porous electrodes 16 and 18 on opposite surfaces of the consumable aluminum anode 20. Each housing wall is formed inwardly with a recess, e.g., 28 defining an enclosing ridge 30 and 32 to space the recessed portions of the walls from the outer sides of the porous electrodes 16 and 18. Inlet conduits, e.g., 34, are formed through the upper portion of each wall 12 and 14, terminating in inlet tubes 38 and 40. Referring only to the rear wall 14, for simplicity, an electrochemically reactive gas, such as chlorine, can be fed through the inlet tube 38, into the recess 28. The frames are provided with cutout regions 46 through which are formed openings 48 for the threaded shank of respective screws 50 therefor, only one of which is shown. The screws 50 are inserted through the openings 48, through similar openings 52 through the outer edges of the porous electrode 18 and then into threaded openings 54 formed through the wall ridge 32. The porous electrode is thus sandwiched between the open frame member 24 and the housing wall 14.

The aluminum anode 20 is formed with a plurality of openings 56 in quadrature array which coincide with similarly formed openings, such as 58, 60 and 62, respectively, through the porous electrodes, rear housing wall 14 and front housing wall 12. Screws 64 are inserted through the quadrature openings 56, 58, 60 and 62, and secured externally of the housing by nuts such as 66.

The result is a compact, securely held battery assembly 10. The porous electrodes 16 and 18 are formed with annularly directed upper portions 68 and 70, respectively, which extend upwardly out of the housing 10 on one side thereof and which are formed in their upper corners with openings, such as 72 coincident with openings 74 and 76 formed through the upper corners on one side of each of the housing walls 12 and 14. The threaded shank of a bolt 78 is inserted through the housing wall opening 74 through the upper corner openings, e.g., 72, of the porous electrode (which is sized to thread closely with the shank 78), through the corner opening 76 in the rear housing wall 14 and secured by a nut 80. The aluminum anode 20 is also formed with an annularly extending upper portion 82, but terminating upwardly out of the housing 10 on a side thereof opposite that of the porous electrodes 16 and 18. An opening 84 is formed through the upper corner of the aluminum anode 20 coincident with similarly formed openings 86 and 88 through the upper corners, on that side, of the housing walls 12 and 14. The threaded shank of a bolt 90 is threaded through the front housing wall opening 86, closely threaded through the aluminum anode opening 84, through the rear housing wall upper opening 88 and then secured by a nut 92.

The result is a compact, rigidly secured battery assembly. Electrical leads 94 and 96 can be secured to the bolts 78 and 90 respectively to make electrical contact, via the lead 94, with the two porous electrodes 16 and 18 and, via the lead 96, to the aluminum anode 20. The assembly can be immersed in a solution of electrolyte, the solution entering the spaces between the porous electrode 16 and 18 and opposite surfaces of the aluminum anode 20 via the cut-away portions 46 of the spacing frames 22 and 24.

The foregoing structure represents one mode of construction for the battery assembly. Other structures could be used, such as molded assemblies.

In operation, chlorine, or other electrochemically reactive fluid, is fed through the inlet tubes 38 and 40 into the recessed wall portions, e.g., 28. The reactive fluid is thus applied to the outer surfaces of the porous electrodes 16 and 18 which are constructed, as will hereinafter be detailed, so as to meter the electrochemically reactive fluid into contact with the electrolyte solution. As the electrochemically reactive fluid contacts the electrolyte, it dissolves in the electrolyte and finally diffuses to the conductive particle surface for electroreduction. Electrochemical oxidation takes place at the consumable aluminum anode 20 to form aluminum chloride which dissolves in the electrolyte and generates electrons at the lead 96 to yield an electrical current.

The specific nature of the consumable anode 20, whether of aluminum or other metal, and the nature of the cathode reactant, whether halogen, or otherwise, are not part of the present invention except insofar as the selection of material with which to form the porous electrodes 16 and 18 to accommodate the use of a corrosive electrochemical reactant such as the halogens. While the present construction finds its best use with gaseous electrochemical reactant, such as chlorine, it can also be used with liquid bromine at room temperature. Details of the nature of the electrolyte, gaseous reactant and purity of the anode 20 can be found in the above-noted pending patent applications, Ser. Nos. 141,906 and 141,880. In an exemplary system, a mercury alloyed aluminum anode is utilized with a chlorine oxidant and an aqueous electrolyte solution of ammonium chloride.

Figure 3:
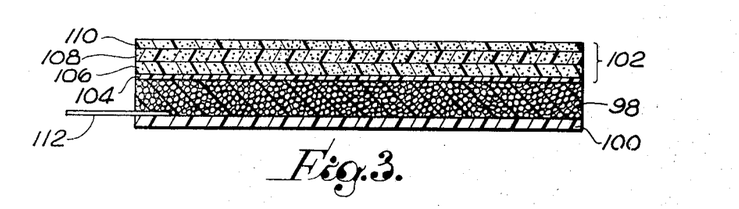
FIG. 3 is a schematic, cross-sectional view of a composite porous electrode of the present invention.

Referring to FIG. 3, the manner of construction of porous electrodes 16 and 18 is illustrated. A porous metal plaque 98 is provided having a porosity of about 25–55 percent. Such a plaque can be formed by filling a die mold of known volume with a known weight of powdered metal. In accordance with this invention the metal is selected from the group consisting of titanium, zirconium, hafnium and alloys thereof, and certain kinds of alloys known as Hastalloy. The metal powder can have a particle shape ranging between spherical and smooth angular, a particle size distribution within the range of −100 +25 mesh, and bulk density within the range of 1.5 to 5.6 grams per cc. The powder is then sintered in a non-reactive atmosphere under such conditions as time, temperature and pressure so as to yield a body having a desired porosity. A method for forming such bodies is given in detail in Davies U.S. Pat. No. 2,997,777, incorporated herein by reference.

The metal plaque is coated with electrically conductive material, as will be described hereinafter, which provides an inert backing for reactive gas distribution as well as for current collection. The plaque is corrosion resistant to the gas and to the electrolyte. In this regard, experiments with nickel, stainless steel, tungsten, palladium, gold, tin and aluminum have all shown various degrees of attack by an aqueous solution of ammonium chloride when used with chlorine reactant and are therefore unsuitable for long term use. The desired thickness of the porous metal plaque will vary with the electrode size and should provide for mechanical strength of the electrode. Typically a plaque of 0.030 inch thickness, with 40 percent porosity, is adequate for an electrode size of 6 inches by 6 inches. The desired porosity and pore size of the plaque are to a large extent a function of the operating pressure of the gas electrode. For a gas pressure in the range of 0 psig to about 5 psig, a suitable porosity and mean pore size are 40 percent and 10 microns, respectively.

The porous metal plaque is sandwiched between two coatings 100 and 102, the coating 100 being solely a hydrophobic material and the coating 102 consisting of a mixture of hydrophobic material and conductive particles. The hydrophobic material serves to repel the electrolyte solution and prevent flooding of the electrode by the electrolyte. Generally the thickness of the hydrophobic coating 100 may vary between 0.0005 inch to about 0.002 inch. The coating 100 of hydrophobic material on one side of the plaque serves only to repel electrolyte whereas the coating 102 on the other side, being loaded with electrically conductive particles, provides the interface, i.e., gas-electrolyte- conductive particles within the layer 102 for the electrochemical reaction to take place.

The coating 102 is preferably formed from a plurality of layers, successively applied and containing successively increasing concentrations of electrically conductive particles. In the specific example illustrated, the coating 102 includes a single layer 104 of unloaded hydrophobic material, about 0.0005 inch thick, with successive layers 106, 108 and 110 containing electrically conductive particles dispersed therethrough. The electrode can be constructed without the thin layer 104 of unloaded hydrophobic material without significant detraction from its performance. In any case, as will be described below, when forming the layer 104, as well as the other layers 106, 108 and 110, sufficient pressure must be applied thereto to assure good electrical contact between the loaded layer 106 and the metal plaque 98.

In a preferred form of the invention, layers 106, 108 and 110 have a graded hydrophobic structure in that the furthest layer 110 contains a relatively high amount of electrically conductive particles, wherein layer 108 contains a lower concentration thereof and layer 106 contains the lowest concentration of electrically conductive particles. In the electrode illustrated, layer 106 consists of equal weights of hydrophobic binder material and electrically conductive particles (on a dry weight basis), layer 108 consists of 25 weight percent binder and 75 weight percent electrically conductive particles, and layer 110 consists of 10 weight percent binder and 90 weight percent electrically conductive particles. It is to be understood that as few as two layers may be adequate. The number of layers is governed by a balance of cost, performance and useful life of the system.

In the embodiment exemplified in FIG. 3, the plaque 98 is formed of titanium and a lead 112 of non-corrosive, electrically conductive metal, such as titanium, is attached to the rear side of the plaque 98 as hereinafter described.

As a hydrophobic binder, one can utilize any of the well known inorganic or organic materials which can be dried and/or cured to form a hydrophobic film and which is substantially inert to halogen. In this regard, one should not have any substantial portion of polyethylene or the like. One can utilize such inorganic materials as clay or kaolin. As useful organic binders one can utilize condensation-type or addition-type polymer forming material, examples of which include: phenol-formaldehyde resin; polyamide resins, such as nylon and polymers obtained from dimerized fatty acids; aromatic polycarbonates; polyether resins, such as epoxy resins, polyethylene oxide, polypropylene oxide, phenoxy resins, polyphenylene oxide resins, polyoxymethylene and chlorinated polyethers; polysulfide resins; polysulfone resins; polyurethane resins; silicone resins, such as polydimethylsiloxane; amino resins, such as urea-formaldehyde resin, melamine-formaldehyde resin; heterocyclic polymers, such as polyvinylcarbazole; polybenzimidazoles and polybenzothiazoles; and polyfluoroolefin resins such as polytetrafluoroethylene, polymonochlorotrifluoroethylene, polyvinylidene fluoride and fluorinated elastomers.

The polyfluoroolefin resins are preferred as being completely inert to the electrochemically reactive fluid and to the electrolyte, and particularly preferred is polytetrafluoroethylene, sold commercially under the trademark Teflon.

Suitable electrically conductive particles include activated carbon, graphite, charcoal, lignite char and carbon. Activated carbon is particularly preferred as providing a desirable electrochemically active surface, high electrical conductivity and a mechanically strong bonded layer. Furthermore, the activated carbon is readily homogenously dispersed in a methanol solution containing aqueous dispersed binder and therefore can be applied by simple spraying techniques. Exemplary activated carbon powder has a surface area greater than 900 m$^2$/g and an ash content of less than 1.5 weight percent. Such powders are superior to graphite powder for example, which imparts substantially higher electrical resistivity to the bonded layers. The size of the particles can be graded and in the illustrated electrode, layer 106 utilizes −80 mesh particles, while layers 108 and 110 utilize −200 mesh particles.

The concentration of electrically conductive particles within each layer determines the porosity, thickness and pore size of the composite layer structure, all of which are important parameters for a gas-diffusion electrode. The composite layers must be thick enough to provide a gas-electrolyte interface within the layers and to prevent solution flooding, yet must be thin enough so that the reaction sites are easily accessible to reactive gas and the reaction products are easily removed. Optimum thicknesses, as well as pore size and porosity can be determined for any of the materials used. In the exemplified electrode, the preferred particle loading for the composite layers are 140 mg/in$^2$ for layer 106, 110 mg/in$^2$ for layer 108 and 60 mg/in$^2$ for layer 110. The corresponding layer thicknesses, before sintering of the electrode, as described hereinafter, are approximately 0.011 inch, 0.010 inch and 0.005 inch for the layers 106, 108 and 110, respectively. These thicknesses may be varied by ±20 percent without introducing a significant difference in electrode performance. The complete composite electrode illustrated has a thickness in the range of about 0.055 inch to about 0.065 inch after sintering, including about 0.030 inch for the porous metal plaque. The porosity of the illustrated composite layers 106, 108 and 110, taken together, is in the range of about 55–65 percent.

Figure 4:
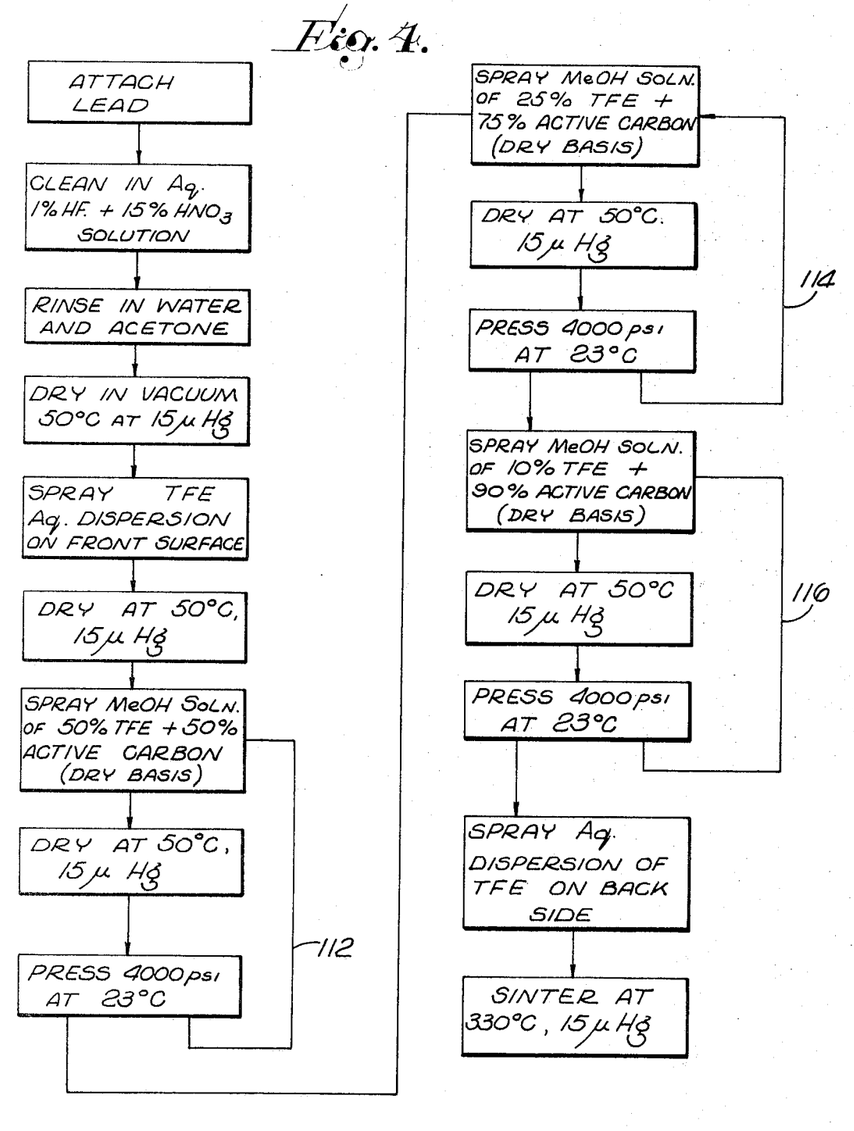
FIG. 4 is a flow chart diagrammatically outlining the principal method steps for preparing the electrode of FIG. 3.

FIG. 4 illustrates a fabrication procedure for the composite electrode of FIG. 3. Initially, the titanium lead 112, about 0.007 inch thick, is attached by spot welding, or the like, to one side of the titanium plaque 98. The plaque is then cleaned in an aqueous solution containing 1 volume percent hydrofluoric acid and 15 volume percent nitric acid, ultrasonically rinsed in a water-acetone solution and then dried at 15 $\mu$ Hg vacuum. A solution is formed of methanol containing an aqueous dispersion of polytetrafluoroethylene (60 percent solids, specific gravity 1.50 — sold under the trade name Teflon 30 by DuPont). The methanol solution is sprayed onto the front surface of the plaque 98, and dried at 50° C in 15 $\mu$ Hg vacuum to form layer 104. Another methanol solution is prepared containing equal weights of polytetrafluoroethylene and activated carbon powder and sprayed onto layer 104. This solution is prepared by adding an aqueous dispersion of polytetrafluoroethylene containing three parts by weight thereof on a dry basis to a suspension of three parts by weight of activated carbon powder in about 59 parts by weight of methanol. The dispersion is kept under mild agitation to insure the homogenous suspension of the carbon powder and to prevent the agglomeration of the polytetrafluoroethylene. After application to layer 104, the electrode is dried at 50° C at 15 $\mu$ vacuum and then pressed under 4,000 psi at 23° C to assure good electrical contact between the layers. As shown by the arrow 112 in FIG. 4, the above step of applying a 50–50 weight percent polytetrafluoroethylene-activated carbon suspension is repeated followed by drying and pressing as above stated to form the desired loading and thickness for the layer 106. Equivalently, the sintering and pressing operations may be done simultaneously providing the atmosphere is inert, such as argon, or if the operations are carried out under vacuum.

Spray solutions for layers 108 and 110 are prepared in the same manner as above, but the volume of aqueous dispersed polytetrafluoroethylene is reduced to one part by weight of polytetrafluoroethylene (on a dry basis) for a layer 108 and 0.33 part by weight of polytetrafluoroethylene for layer 110. A small amount, e.g., 2 weight percent, of a wetting agent can be added to the methanol solution for emulsion stabilization but is not generally necessary. In each case, double applications of the solutions are made as shown by the arrows 114 and 116 and the sprayed layers are pressed under 4,000 psi at 23° C after each application.

The aqueous dispersion used to form layer 104 is thereafter applied to the back side of the plaque to form the layer 100 of polytetrafluoroethylene thereon having a thickness of about 0.001 inch.

Thereafter, the electrode is sintered at about 320° C in 15 $\mu$ Hg vacuum for about 20 minutes. In place of vacuum, the electrode can be sintered under a moderate pressure, e.g., 1,000 psi, in argon, or other inert atmosphere.

Electrodes fabricated as above were tested as a chlorine gas electrode at a pressure of 1–4 psi against a calomel reference electrode in an aqueous NH$_4$Cl solution. The open circuit voltage of the chlorine electrode was +1.03 volt versus the reference electrode as compared to a theoretical value of +1.05 volt. This clearly indicated that the composite electrode was inert to the chlorine gas and that a reversible chlorine reaction had been established at the composite electrode surface. The chlorine electrode voltage dropped 0.54 volt when discharged at 1.0 amperes/in$^2$ current density in an Al/Cl$_2$ cell. This corresponds to a resistance of 0.54 ohm/in$^2$ electrode area which is largely associated with the ohmic resistance within the composite electrode structure. This structural resistance value is comparable to that of other gas electrodes. Upon continuous discharge of the chlorine electrode at a constant current density of 0.5 amperes/in$^2$, a constant chlorine electrode voltage of +0.8 volt versus the reference electrode was maintained over a 3 hour period before polarization appeared at the chlorine electrode. However, the performance of the composite electrode quickly recovered when the electrolyte was replaced, demonstrating that the polarization was associated with the electrolyte near the electrode surface rather than with resistance of the composite structure. In this manner, the composite electrode was repeatedly used for over 20 hours with no apparent performance deterioration. Furthermore, the composite electrodes showed no apparent flooding by electrolyte solution and bubble tests showed that gas bubble distribution was uniform over the composite electrode surface.

Figures 7, 8:
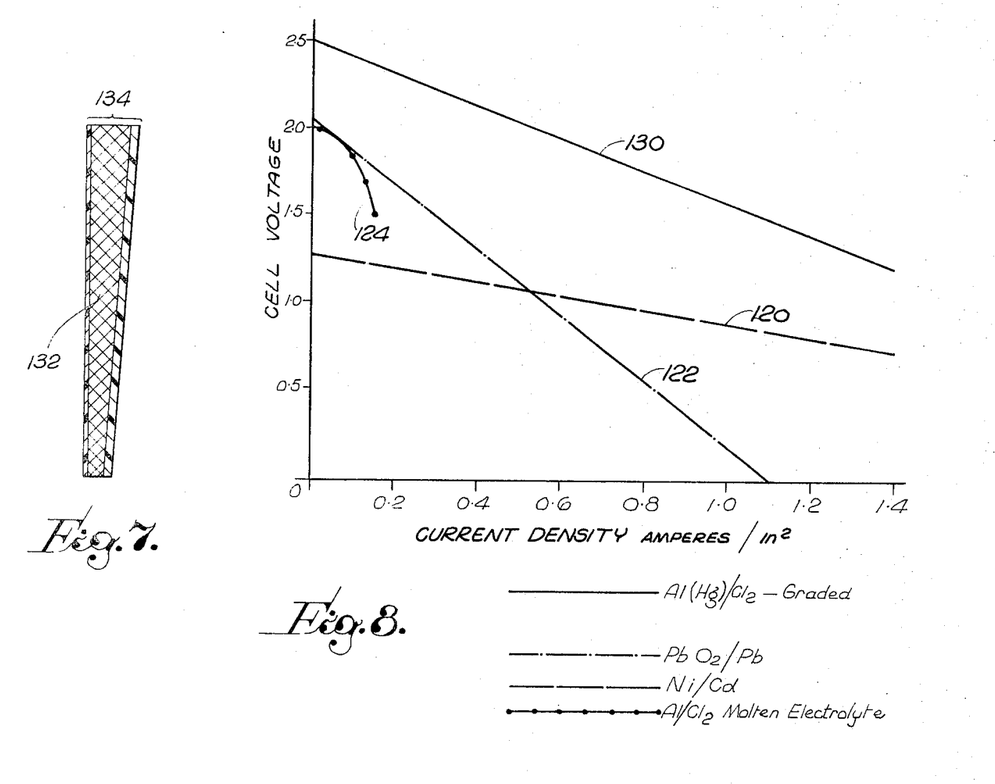
FIG. 7 is a schematic, cross-sectional view of an alternative graded electrode structure.
FIG. 8 illustrates the voltage characteristics of a battery assembly of the present invention as compared to the voltage characteristics of prior art batteries.

In other tests, the electrodes were tested as the chlorine gas electrode in an aqueous aluminum-chlorine cell, at a pressure of 1–4 psi, and gave excellent electrochemical performance. Referring to FIG. 8, the voltage characteristics (solution IR included) of such a battery assembly is compared with the characteristics of typical nickel-cadmium and lead acid batteries as well as an aluminum-chlorine battery using molten aluminum chloride-sodium chloride-potassium chloride (66 percent: 20 percent: 14 percent) electrolyte at 150° C (J. Giner and G. L. Holleck: *Aluminum-Chlorine Battery*, NASA Cr-154, March 1970). The foregoing battery assembly had an open circuit voltage of about 2.5 volts compared to reported values of 1.3 volts for a nickel-cadmium battery, 2.1 volts for a lead acid battery and 2.0 volts for the molten electrolyte battery. Voltage-current behavior of these batteries are compared as indicated by the lines 130, 120, 122 and 124, respectively.

Figure 5:
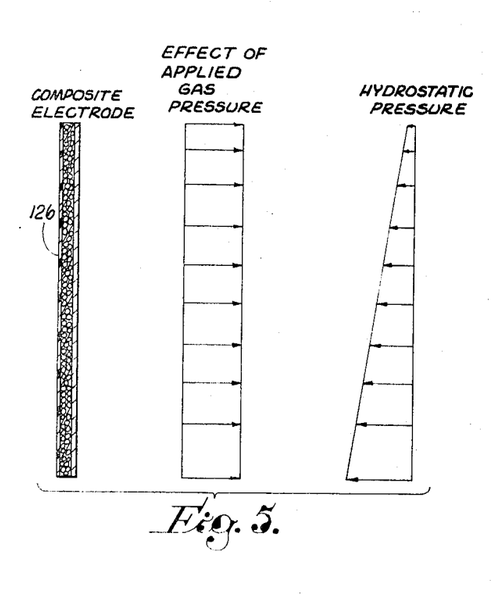
FIG. 5 is a schematic illustration of the relationships between the composite electrode, applied gas pressure and hydrostatic electrolyte solution pressure for a uniform thickness electrode.

The foregoing fabrication techniques and electrode structures are quite suitable for small electrode sizes, e.g., 1–4 square inches. With larger electrodes, there is some decrease in efficiency as a result of hydrostatic pressure effects in the electrolyte. Referring to FIG. 5, the applied gas pressure and hydrostatic electrolyte pressure are compared for a composite electrode 126 as fabricated above, but having surface dimensions of about 6 inch square. It is seen that the effect of the applied gas pressure is uniform throughout the length of the composite electrode structure. However, it is also seen that the hydrostatic pressure of the electrolyte, exerted on the electrode surface, varies from a relatively high pressure at the bottom of the electrode to a relatively low pressure at the top thereof. This results in only a partial utilization of the total electrode surface with excessive gas permeation and bubbling at the electrode top and with decreased gas permeation at the electrode bottom. This effect is of no practical significance in small electrodes, say, 4 inches or lower, but becomes more significant with larger sizes.

Figure 6:
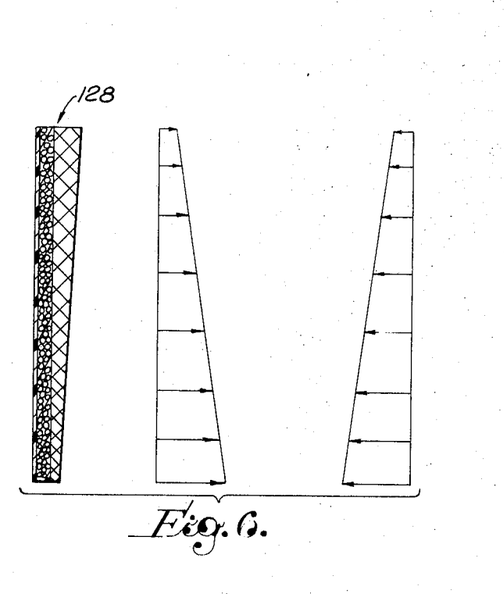
FIG. 6 is a schematic illustration of the relationship between the composite electrode, applied gas pressure and hydrostatic electrolyte solution pressure for a graded thickness electrode.

Referring to FIG. 6, a composite electrode 128 is shown which is designed to overcome such hydrostatic pressure effects. The electrode 128 is formed with a thickness differential between the bottom and top edges so that the electrode increases in thickness from bottom to top in conformity with the decrease in hydrostatic pressure of the electrolyte solution. By such means, the effect of the applied gas pressure is small where the hydrostatic pressure is small and relatively large where the hydrostatic pressure is relatively large.

In the electrode 128 in FIG. 6, the thickness differential is obtained by applying the carbon-binder layers with a graded thickness. This is accomplished by compacting the applied layers under different pressures along the length of the electrode. For example, with a 6 inch square electrode, the surface can be divided into 3 regions each having a cross-sectional area of 2 inches × 6 inches. The carbon-binder layer in the bottom section is formed with a basic thickness which is the same as described with respect to the electrode structure of FIG. 3. For the middle section, the thickness of each of the applied layers is increased by about 20–35 percent of the basic thickness and for the top section the increase is about 35–50 percent of the basic thickness. Therefore, with three carbon-binder layers of 0.011 inch, 0.010 inch and 0.005 inch, the graded composite electrode has an overall carbon-binder layer thickness varying between 0.026 inch on the bottom to about 0.039 inch on the top. Generally, the thickness differential of the carbon-binder coating should be about 3–14 percent per inch length of electrode.

The grading of the layers can be made gradual rather than as a step function in the course of spray coating the three regions. The pressures for compacting the layers can also be varied to maintain uniform electrical conduction therealong. For example, the top section can be formed using a pressure of about 4,000 psi, the middle section using a pressure of about 3,000 psi and the bottom section using a pressure of about 2,000 psi. The result is a higher gas pressure drop across the composite layer at the top and a lower pressure drop at the bottom yielding a gas pressure profile along the length of the electrode balancing that of the hydrostatic pressure of the electrolyte.

A 6 inch × 6 inch electrode formed with a graded structure in accordance with the foregoing showed an improvement in gas distribution as compared to a non-graded electrode of the same size, resulting in a high utilization of the electrode surface, e.g., greater than 80 percent. An electrode so prepared was tested in the aqueous aluminum-chlorine cell referred to above. The results (solution IR included) are substantially the same as that of the small electrode of FIG. 3, and can be shown by the same line 130 in FIG. 8. It is seen that the open cell voltage was 2.5 and that the cell voltage drop mainly resulted from ohmic polarization due to solution resistance and structural resistance of the chlorine electrode. When tested against a calomel reference electrode, the composite electrode voltage dropped by only 0.5 volt when discharged at 0.77 amp/in$^2$. The resistance was primarily confined to the porous structure of the composite electrode and was approximately 0.65 ohm/in$^2$. The performance of the larger electrode therefore substantially reproduced the results obtained with the smaller electrode illustrated in FIG. 3.

Referring to FIG. 7, there is illustrated an alternative embodiment of the invention wherein a thickness differential is accomplished by varying the thickness of the metal body 132 of the electrode 134 while maintaining the carbon-binder layers at a uniform thickness. The same thickness dimensions as previously referred to can be utilized. One may also vary both the thickness of the porous metal body and carbon-binder layer to accomplish the same gas pressure profile.

While the invention has been described with respect to a particular electrode structure, various modifications, other than those illustrated, can be made. For example, the thicknessess of the composite layers and the compaction pressure may be varied to obtain an optimum composite electrode structure for a specific requirement of the electrode.

We claim:
1. A composite porous electrode, comprising:
   a porous metal body having a first surface for facing electrochemically reactive fluid and a second surface for facing aqueous electrolyte solution;

a layer of hydrophobic material on said first surface, substantially inert to halogen, for repelling said electrolyte solution therefrom;

a coating of electrically conductive particles dispersed in a hydrophobic binder therefor on said second surface, the concentration of said electrically conductive material in said coating thereof being lower in regions spaced relatively close to said second surface than in regions spaced further therefrom.

2. The electrode of claim 1 wherein said coating of electrically conductive particles comprises at least a first region spaced relatively close to said second surface having a relatively low concentration of electrically conductive particles and a second region formed integral with said first regions, spaced further from said second surface, and having a relatively high concentration of electrically conductive particles.

3. The electrode of claim 2 wherein said first region contains about 35-65 weight percent of activated carbon as said electrically conductive particles and said second region contains a higher concentration of activated carbon than said first region, said higher concentration being in the range of about 60-90 weight percent activated carbon.

4. The electrode of claim 3 wherein said coating of said electrically conductive particles includes a third region integral with said second region, spaced further from said second surface than said second region and containing a higher concentration of activated carbon than said second region, said higher concentration of said third region being in the range of about 80-99 weight percent activated carbon.

5. The electrode of claim 4 wherein said third region is substantially thinner than said second region.

6. The electrode of claim 1 including hydrophobic material coated on said second surface and formed integral with said coating of electrically conductive particles.

7. The electrode of claim 1 wherein said electrically conductive material comprises activated carbon having a surface area greater than about 900 m²/gm and an ash content of less than about 1.5 weight percent.

8. The electrode of claim 1 wherein said porous metal body is formed of a metal selected from titanium, zirconium, hafnium and alloys thereof.

9. The electrode of claim 1 wherein said porous metal body is formed of titanium.

10. The electrode of claim 1 wherein said metal body has a porosity of about 25-55 percent.

11. The electrode of claim 1 in which said coating of conductive particles has a porosity of about 40 percent to about 80 percent.

12. The electrode of claim 1 wherein said hydrophobic coating on said first surface and said binder material comprise a polyfluorolefin resin.

13. A porous composite electrode having a thickness differential between the bottom and top edges thereof, comprising:

a porous metal body having a first surface for facing electrochemically reactive fluid and a second surface for facing aqueous electrolyte solution;

a layer of hydrophobic material on said first surface, substantially inert to halogen, for repelling said electrolyte solution therefrom;

a coating of electrically conductive particles dispersed in a hydrophobic binder therefor on said second surface; and means for making electrical contact to said metal body;

said electrode having a thickness of first magnitude along the bottom edge and increasing therefrom to a thickness of greater magnitude along its top edge.

14. The electrode of claim 13 wherein said increase in thickness is substantially uniform along the length of said electrode.

15. The electrode of claim 13 wherein said coating of said electrically conductive material is formed with said thickness differential.

16. The electrode of claim 15 wherein the thickness differential of said coating of electrically conductive material is about 3-14 percent per inch length thereof.

17. The electrode of claim 13 wherein said metal body is formed with said thickness differential.

18. The electrode of claim 17 wherein the thickness differential of said metal body is about 3-14 percent per inch length thereof.

* * * * *

PO-1050
(5/69)

UNITED STATES PATENT OFFICE
CERTIFICATE OF CORRECTION

Patent No. 3,840,407            Dated  October 8, 1974

Inventor(s)  Neng-Ping Yao, Robert L. Oliver, Harvey N. Seiger

It is certified that error appears in the above-identified patent and that said Letters Patent are hereby corrected as shown below:

Column 8, line 37, change "320°" to --330°--.

Signed and sealed this 10th day of December 1974.

(SEAL)
Attest:

McCOY M. GIBSON JR.                 C. MARSHALL DANN
Attesting Officer                   Commissioner of Patents